United States Patent [19]

Mäkinen et al.

[11] Patent Number: 4,642,133
[45] Date of Patent: Feb. 10, 1987

[54] PROCESS FOR CHLORINATING VOLATILIZATION OF METALS WHICH ARE PRESENT IN OXIDIC IRON ORES OR CONCENTRATES

[75] Inventors: Juho K. Mäkinen, Vanha-Ulvila; Mauri J. Peuralinna, Harjavalta; Olavi A. Aaltonen, Pori, all of Finland

[73] Assignee: Outokumpu Oy, Helsinki, Finland

[21] Appl. No.: 527,194

[22] Filed: Aug. 26, 1983

Related U.S. Application Data

[63] Continuation of Ser. No. 286,021, Jul. 22, 1981, abandoned.

[30] Foreign Application Priority Data

Aug. 20, 1980 [FI]  Finland ................................. 802626

[51] Int. Cl.[4] .............................................. C22B 1/08
[52] U.S. Cl. .............................................. 75/2; 75/9; 75/111; 75/113; 75/121; 423/46; 423/138; 423/149; 423/155
[58] Field of Search ............... 423/149, 136, 138, 155; 75/1 R, 121, 9, 2, 111, 113

[56] References Cited

U.S. PATENT DOCUMENTS

| | | | |
|---|---|---|---|
| 3,499,754 | 3/1970 | Colombo et al. | 423/138 |
| 3,758,675 | 9/1973 | Piccolo et al. | 423/659 |
| 3,791,812 | 2/1974 | Frank et al. | 75/9 |
| 3,810,970 | 5/1974 | McCormick | 423/498 |
| 4,230,487 | 11/1980 | Demarthe et al. | 75/120 |

FOREIGN PATENT DOCUMENTS 1093280  1/1981  Canada ................................. 23/280

OTHER PUBLICATIONS

Okubo, Yasutake, "Kowa Seiko Pelletizing Chlorination Process-Integral Utilization of Iron Pyrites", Journal of Metals, Mar., 1968, pp. 63-67.

*Primary Examiner*—John Doll
*Assistant Examiner*—Robert L. Stoll
*Attorney, Agent, or Firm*—Brooks Haidt Haffner & Delahunty

[57] ABSTRACT

A process and apparatus is disclosed for the chlorinating volatilization of impurity metals detrimental to the production of iron from a raw material which contains the oxides of the impurity metals and iron or which forms them in an oxidizing atmosphere, in which the pulverous raw material is at a high temperature of 900° C. or more and in an oxidizing atmosphere contacted with a magnesium chloride in order to chlorinate and volatilize the impurity metals. The preheated raw material and anhydrous magnesium chloride are fed into a fluidized bed on an inclined grate, hot air being fed into the bed through the grate in order to volatilize the chlorides of the impurity metals, and purified raw material is discharged from the lower section of the fluidized bed into a separate chamber, in which it is rinsed with an air flow the flow rate of which is substantially higher than that of the air flow fed into the fluidized bed.

4 Claims, 2 Drawing Figures

PROCESS FOR CHLORINATING VOLATILIZATION OF METALS WHICH ARE PRESENT IN OXIDIC IRON ORES OR CONCENTRATES

This application is a continuation of application Ser. No. 286,021 filed July 22, 1981 now abandoned.

BACKGROUND OF THE INVENTION

The present invention relates to a process for the chlorinating volatilization of metals which constitute impurities detrimental to iron production from a raw material which contains oxides of the impurity metals and iron and/or which forms them in an oxidizing atmosphere.

In the case of pure pyrites or pyrrhotites, which do not contain detrimental amounts of non-ferrous metals, such as copper, zinc and lead, their calcines are usable as such as raw material for the production of iron. The calcines are either pelleted, sintered or reduced as such to spongy iron. Such pyrite or pyrrhotite ores and concentrates are often impure, i.e. they contain the above-mentioned non-ferrous metals in such amounts that their calcines cannot as such be used as raw materials for iron production, but they have to be purified first in some manner. Sometimes the concentrations of these substances detrimental to iron production, especially the concentrations of noble metals, can be so high that their removal and recovery from the calcines is financially profitable, but the share of the iron ore obtained is, however, significant for the economy of the entire treatment. The methods for purifying such calcines include sulfating and chlorinating treatments, and combinations of these. Sulfating is carried out at a temperature of 650°-700° C. either as a direct sulfating of the concentrates or so that, for example, ⅔ of the concentrate is first dead roasted and the product of this dead roasting is then sulfated by means of the remaining ⅓ of the concentrate. During sulfating, the temperature and the oxygen pressure are so high that the iron practically remains as hematite but the copper, zinc, cobalt and nickel are converted to soluble sulfates and can be leached out and treated separately, and purple ore is obtained as raw material for iron production. One of the disadvantages is the fact that lead and noble metals are left in the purple ore.

There are several chlorination methods, but only the Kowa Seiko process has been developed to an industrial scale (U.S. Pat. No. 3,482,964). Duisburger Kupferhütten has its own chlorinating roasting process, in which sodium chloride is added in connection with sulfating, whereby soluble sulfates and chlorides are obtained. Several articles have been published on the Kowa Seiko Process, for example, Yasutake Okuho: "Kowa Seiko Pelletizing Chlorination Process—Integral Utilization of Iron Pyrites", Journal of Metals, March 1968, p. 63–67.

In the Kowa Seiko process, the pyrite or pyrrhotite calcine is finely ground, pelletized with lime and calcium chloride dried, and fed into a revolving tube furnace, in which the temperature of the pellets is increased by countercurrent heating in an oxidizing atmosphere to about 1250° C., whereby the metal oxides are chlorinated by the action of calcium chloride, and the produced metal chlorides volatilize and pass into the flue gases, from which they are recovered by a hydrometallurgical treatment, and the chlorine is regenerated to calcium chloride. During the chlorination, the calcium of the calcium chloride is converted to CaO and can react with hematite to calcium ferrite, $CaO \cdot Fe_2O_3$, or with silicic acid to calcium silicate, $CaO \cdot SiO_2$. The rule is that in the final product the molar ratio of CaO to $SiO_2$ must be 0.5–0.8, in order for the pellets to be firm enough to be fed into the blast furnace. Obviously for this reason, the total concentration of the metals to be volatilized must not exceed 2.5%. If there is not enough silicic acid, $SiO_2$, to combine to silicates the existing CaO or the CaO produced during the chlorination, there may form $CaO \cdot Fe_2O_3$ with a melting point of 1216° C., and the pellets disintegrate or sinter as early as during the chlorination. Considering that, during roasting, metal oxides tend to form ferrites, $MeO \cdot Fe_2O_3$, easily, the formation of calcium ferrites during the chlorination is highly probable.

$$CaCl_2 + MeO \cdot Fe_2O_3 \rightarrow CaO \cdot Fe_2O_3 + MeCl_2 \qquad (1)$$

Calcium ferrite forming in low concentrations only keeps the pellets cohesive, but after it exceeds a certain limit it obviously weakens them. Furthermore, the process is not particularly advantageous in terms of thermal economy, for the hot product, about 900°–950° C., obtained from the roasting of sulfides must be cooled for grinding and pelletization, whereby the amount of heat corresponding to its enthalpy is lost. This corresponds to about 670 MJ/one tonne of pyrite. Other chlorination processes are based on the use of elemental chlorine and they are only at a pilot plant stage.

The object of the invention is to eliminate the above-mentioned disadvantages and to produce a process in which compounds with low melting points cannot form and in which substantially less chlorinating agent is used than thus far.

SUMMARY OF THE INVENTION

According to the present process the pulverous raw material is contacted with $MgCl_2$ at a temperature of at least 900° C.

In the present invention, the weak points of the Kowa Seiko process, described above, have thus been eliminated in two ways. By using magnesium chloride instead of calcium chloride as the chlorinating agent, low melting compounds are not produced, since, for example, $MgO \cdot Fe_2O_3$ is still in solid state at 2200° C. and the lowest Mg silicate melts at 1577° C. As $MgCl_2$ contains 74.8% chlorine versus the 64% contained in $CaCl_2$, less magnesium chloride is required for the chlorination of the same amount of metal. Moreover, magnesium chloride is thermodynamically a more effective chlorinating agent of oxides than is calcium chloride.

The present invention is also more economical than the Kowa Seiko process in terms of heat technology. The pyrite or pyrrhotite calcine obtained from the roasting furnace can be used directly while hot, at over 900° C., and the required amount of magnesium chloride can be added to it either as a melt spray or in granular form. A revolving tube furnace or a fluidized-bed furnace can be used for the chlorination. Since the chlorides of non-ferrous metals have a considerable vapor pressure as soon as at a temperature above 900° C., thermal energy is hardly required for anything else but for maintaining the temperature, and not for raising it. Even in small furnace units, a many-fold retention time is obtained in the reaction zone, as compared with the Kowa Seiko process, in which the chlorination reactions do not occur until within the last two meters.

Furthermore, the process according to the invention is not sensitive to the sulfur content of the calcine, since the entire operation is carried out at a temperature above 900° C. In the Kowa Seiko process, in which the cold end of the furnace is at about 500°–600° C., there clearly prevail sulfating conditions. Both sulfates of non-ferrous metals and gypsum tend to form, and they pass, unvolatilized, towards the hot end of the furnace, where attmepts are made to decompose them, for the completed pellets must not contain much sulfur. Partly for this reason the temperature must be 1200°–1250° C. At a temperature above 900° C., there occurs hardly any formation of SO₃; calculating from the reaction $$SO_2 + \tfrac{1}{2} O_2 \rightleftharpoons SO_3 \quad \Delta G°_{900°C.} = +14.7 \text{ kJ} \quad (2)$$

And assuming that the gas contains 1% O₂

$$pSO_3/pSO_2 \cong 0.02.$$

The present invention can be used not only for the purification of the above-mentioned pyrite and pyrrhotite calcines but also for the treatment of other oxidic ores, such as laterites. As known, in laterites nickel is present as oxides, and according to the reaction $$NiO + MgCl_2 \rightleftharpoons MgO + NiCl_2 \quad \Delta G°_{1000°C.} = -62.9 \text{ kJ} \quad (3)$$

the equilibrium is strongly towards the right, i.e. on the NiCl₂ side. Since the sublimation pressure of nickel chlorite at 970° C. is over 770 torr, the reaction occurs at temperatures even below 1000° C. As can be seen from reactions (4) and (5), the forming NiCl₂ is sensitive to neither oxygen nor water vapor.

$$2NiCl_2 + O_2 \rightarrow 2NiO + 2Cl_2 \quad \Delta G°_{1000°C.} = +54.5 \text{ kJ} \quad (4)$$

$$NiCl_2 + H_2O \rightarrow NiO + 2HCl \quad \Delta G°_{800°C.} = -18.9 \text{ kJ} \quad (5)$$

If iron tends to be chlorinated, it is converted according to Reaction (6) to hematite and gaseous chlorine, which is, furthermore, an effective chlorinator of NiO according to Reaction (7).

$$2FeCl_2 + 1\tfrac{1}{2}O_2 \rightarrow Fe_2O_3 + 2Cl_2 \quad \Delta G°_{1000°C.} = -125.7 \text{ kJ} \quad (6)$$

$$2NiO + 2Cl_2 \rightarrow 2NiCl_2 + O_2 \quad \Delta G°_{1000°C.} + -54.5 \text{ kJ} \quad (7)$$

Thus, any fuel can be used as a source of heat, and the chlorination can be carried out in, for example, a revolving tube furnace or a fluidized-bed furnace.

By the process according to the present invention, the nonferrous metals which are present as impurities can thus be removed directly from the hot calcine obtained from the roasting of pyrite or pyrrhotite concentrates by adding to the calcine magnesium chloride in an amount at least equivalent to the non-ferrous metals in an oxygen-bearing atmosphere at a temperature of over 900° C., and by condensing and washing the volatilized metal chlorides in an aqueous solution these valuable metals can be recovered by known hydrometallurgical processes and by regenerating for reuse the chlorine present in these metal chlorides by means of MgO to MgCl₂. The purified hot calcine can be fed directly to the production of, for example, spongy iron or cooled in, for example, a fluidized-bed cooler, thereby producing low-pressure vapor, or the heat, contained in it can be used for, for example, heating the oxygen-bearing gas required for the chlorination, and the cooled, purified calcine, purple ore, can be directed as raw material to iron production.

When laterites, ores with a low nickel content, are involved, which in themselves do not contain any combustible material, they must first be heated to a reaction temperature of over 900° C. by using any locally economical fuel, and by proceeding in other respects in the same manner as described above regarding pyrite and/or pyrrhotite calcines, the valuable substances present in the laterites, e.g. nickel, cobalt and platinoids, can be separated as chlorides, and the remainder of the ore can be left as waste.

How the metals are recovered from the chloride solution is highly dependent on the local conditions. The treatment can be as in for example, the Kowa Seiko process, but also entirely different hydrometallurgical methods can be used. In any case, the chlorine is neutralized by means of MgO or Mg(OH)₂, and the MgCl₂ is concentrated, crystallized and calcinated, and then returned to the chlorination process.

DESCRIPTION OF THE PREFERRED EMBODIMENTS

Figure 1:
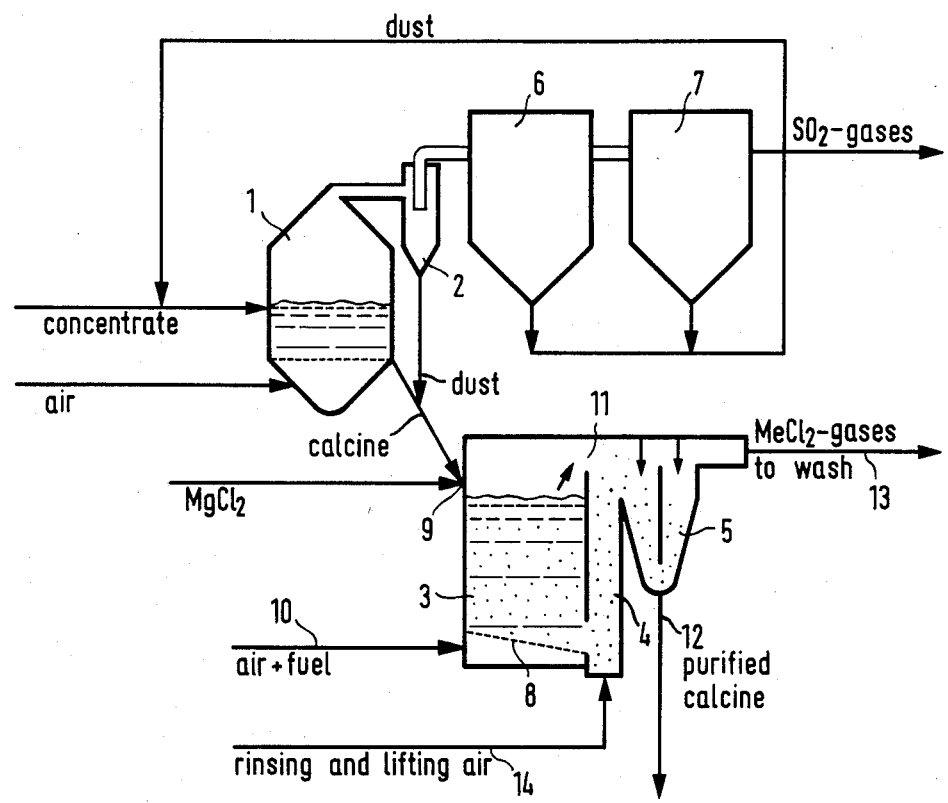
FIGS. 1 and 2 depicts sectioned side views of two preferred embodiments suitable for carrying out the process according to the invention.

In FIG. 1, the roasting is carried out in a fluidized-bed reactor 1, from which the calcine and the dust separated in a hot cyclone 2 are directed to a chlorination reactor 3. The flue gases continue their journey from the hot cyclone 2 to a waste heat boiler 6 and via an electric filter 7 to, for example, a sulfuric acid plant. The fine, sulfate-bearing dust obtained from the boiler and the electric filter is recycled, together with the concentrate, to the roasting reactor 1. The hot, over 900° C., calcine obtained from the roasting reactor 1 and the hot cyclone 2 is directed together with the non-ferrous metals to the chlorination reactor 3 with at least an equivalent amount of MgCl₂₂ introduced at 9. The chlorination reactor is a fluidized-bed reactor 3 provided with a somewhat inclined grate 8, in which the flow rate of air in free space is low, 1–30 cm/s. Air and fuel are fed under the grate 8 by the pipe 10. At the lowest end of the inclined grate 8, there is an opening which directs material into the rinsing and outlet pipe 4. Here the flow rate of air introduced by pipe 14 is higher than above, e.g. 0.5–17 m/s, whereby the chlorinated calcine is rinsed of metal chlorides and can be lifted according to the air lift principle to the desired height for the separation 5 of calcine, and the chlorides carried by the gases 13 can be directed to a wash and a hydrometallurgical treatment. The gases from both the chlorination reactor 3 and the rinsing and riser pipe 4 meet at the upper end 11 of the riser pipe 4. In order to maintain the temperature balance the air of both the chlorination reactor 3 and the rinsing pipe 4 is dried and sufficiently preheated. The purified calcine is withdrawn from the bottom of the separator 5 via pipe 12.

Figure 2:
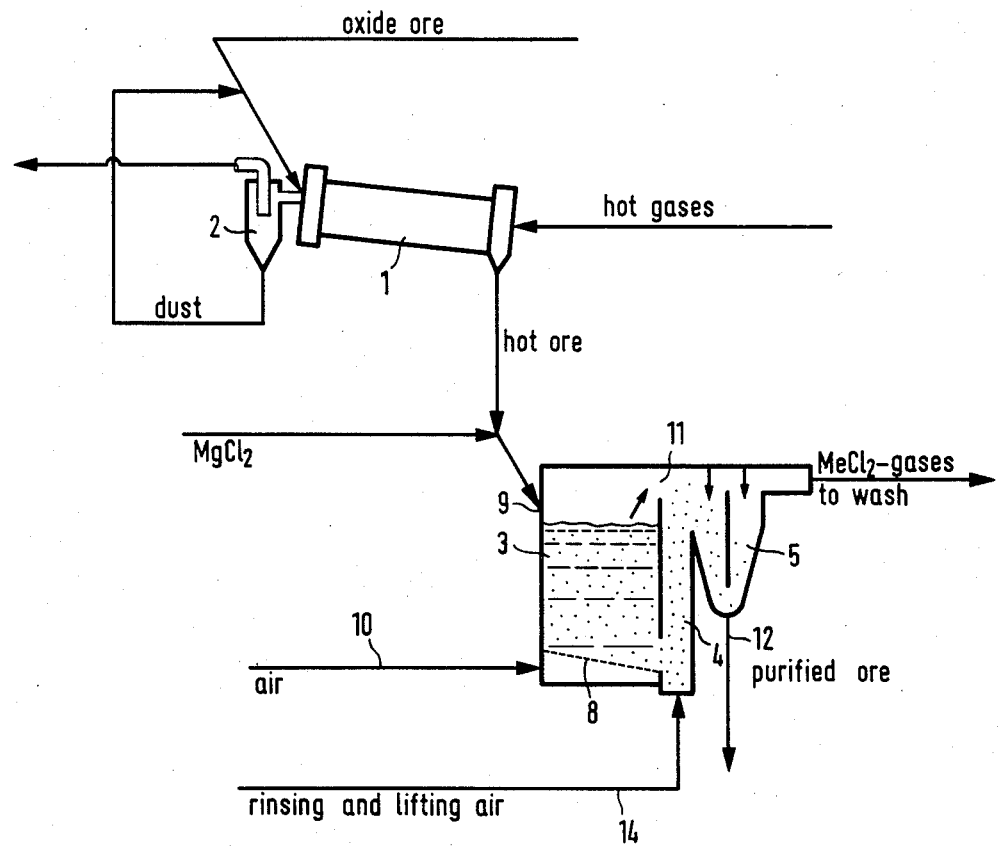

The embodiment of FIG. 2 is suitable for the treatment of calcines or oxidic ores. The ore is heated using, for example, oil countercurrently in a revolving tube furnace 1, to at least the reaction temperature. The calcinated MgCl₂ is directed into the ore flow and the chlorination is carried out as described above. The oxidic ore can, of course, be heated by other known methods as well. The main point is that the ore is heated at least to the reaction temperature before it is fed into the chlorination reactor 3.

Other embodiments of apparatus can, of course, also be used for the chlorination than those shown in FIGS. 1 and 2. Such could be, for example, an ordinary fluidized-bed reactor or a revolving tube furnace.

The invention is described below in greater detail by way of examples.

EXAMPLE 1

The example describes the processing of a pyrite concentrate by the process according to the ivention for the treatment of pyrite or pyrrhotite calcines or other oxidic ores.

The treatment of pyrite concentrate in order to volatilize detrimental impurities is carried out using the apparatus depicted in FIG. 1. Detrimental impurities in the pyrite concentrate according to the example are Zn, Pb, Cu and As, which are removed using chlorinating volatilization. In addition, small amounts of silver and gold are present in the pyrite concnetrate.

Table 1 shows the compiled material balance calculations of the treatment of pyrite concentrate according to the example. Table 2 shows the percentage distribution of the principal constituents during the various treatment stages.

In accordance with FIG. 1, the pyrite concentrate corresponding to the example is first roasted at a temperature of 950° C. Thereby 62.5% of the As is removed from the material (Table 2) in the reaction gases formed. The calcine and the fly dust separated from the reaction gases in the cyclone are thereafter directed uncooled into the chlorination reactor, which is, in accordance with the embodiment, a fluidized-bed furnace with an inclined grate. Anhydrous magnesium chloride is fed as a chlorinating agent into the chlorination reactor, the temperature of which is 1200° C.; its amount is equivalently at least sufficiently high for all the detrimental impurities to be completely converted to their volatile chlorides. The calcine fed into the chlorination reactor, mentioned in Table 1, is by its analysis a mixture of calcine and fly dust.

The chlorinated calcine is directed along the inclined grate of the fluidized-bed furnace into the rinsing and outlet pipe of the chlorination reactor; into this pipe, air is fed within the limits set by the temperature. Thereby the material is, by means of the high flow rate of the rinsing air, freed of metal chlorides and lifted to the desired level. At the same time the chlorinated calcine and the volatile metal chlorides can be effectively separated from each other.

An examination of the material balance values of Table 1 shows that the removals of the various constituents as volatile metal chlorides are as follows in the chlorinating treatment according to the ivention:

Zn 96.7%; Pb 92.5%; As 80%; Cu 86.6%; Ag 90.3%; Au 92.9%.

Also taking into consideration the volatilizations occurring during the roasting, the following total yields are obtained for the various constituents in the outlet gases:

Zn 96.7%; Pb 92.5%; As 92.5%; Cu 86.6%; Ag 90.3%; Au 92.9%.

The effect of the chlorinating treatment on the total volatilizations is thus considerable.

The chlorinated calcine treated in accordance with the invention can be used for further refining for the production of, for example, crude iron, since the low contents of impurities present in the calcine are not detrimental.

EXAMPLE 2

The chlorinating treatment according to the invention, corresponding to Example 2, relates to a laterite ore which contains, in oxide and hydroxide form, various amounts of iron, nickel, copper and cobalt. A more detailed analysis of the laterite ore is given in connection with the material balance calculations according to the example in Table 3 and the distribution of the principal constituents during the various treatment stages in Table 4.

The treatment of laterite ores for the removal of detrimental impurities is carried out in accordance with the embodiment of FIG. 2.

The laterite ore is heated in a revolving tube furnace under reducing conditions to a temperature of 1250° C. The reducing conditions are produced with a $CO/CO_2$ equilibrium, and the reducing gas is directed in the furnace countercurrently to the ore. In the case according to Example 2, the reduction is carried out in such a manner that 20% of the cobalt and 50% of the iron remains in oxidic form, while the other constituents, nickel and copper, are reduced completely. The dry product of reduction is fed, together with the chloride of the calcinated reagent, serving as the chlorinating agent, into the chlorination reactor, the structure of which corresponds to the chlorination reactor mentioned in Example 1 and in which the chlorination thus takes place in the manner described in Example 1.

On the basis of the results of Table 3, the following values are obtained for the volatilizations of the various impurity constituents in the chloride dust (Table 4):

Ni 91.2%; Cu 70.0%; Co 81.0%.

The chlorination process according to the invention is thus also highly suitable for oxide ore.

The product of chlorination obtained in Example 2, as is the chlorinated calcine of Example 1, is a useable material for the production of crude iron, for example, since the amount of detrimental impurities has been decreased to a sufficiently low level by the chlorinating treatment according to the invention.

TABLE 1

| | Amount | Fe | | S | | Zn | | Pb | | As | | Cu | | CaO | |
|---|---|---|---|---|---|---|---|---|---|---|---|---|---|---|---|
| | kg | kg | % | kg | % | kg | % | kg | % | kg | % | kg | % | kg | % |
| Pyrite concentrate | 1000.0 | 416 | 41.6 | 450 | 45.0 | 30.0 | 3.0 | 8.0 | 0.8 | 4.0 | 0.4 | 9.0 | 0.9 | 6.0 | 0.6 |
| Calcine | 745.8 | 416 | 56.0 | 3.7 | 0.5 | 30.0 | 4.0 | 8.0 | 1.1 | 1.5 | 0.2 | 9.0 | 1.2 | 6.0 | 0.8 |
| $MgCl_2$ | 75.3 | | | | | | | | | | | | | | |
| Chlorinated calcine | 716.7 | 411.8 | 57.5 | 3.5 | 0.5 | 1.0 | 0.14 | 0.6 | 0.08 | 0.3 | 0.04 | 1.3 | 0.18 | 6.0 | 0.84 |
| Chloride | 96.2 | 4.2 | 4.5 | 0.2 | 0.2 | 29.0 | 30.4 | 7.4 | 7.9 | 1.2 | 1.3 | 7.7 | 8.2 | | |

TABLE 1-continued dust

|  | Amount | MgO | | SiO$_2$ | | O | | Cl | | Ag | | Au | |
|---|---|---|---|---|---|---|---|---|---|---|---|---|---|
|  | kg | kg | % | kg | % | kg | % | kg | % | g | g/t | g | g/t |
| Pyrite concentrate | 1000 | 1.0 | 0.1 | 76 | 7.6 | | | | | 35 | 35 | 7 | 7 |
| Calcine | 745.8 | 1.0 | 0.1 | 76 | 10.2 | 194.6 | 25.9 | | | 35 | 47.0 | 7 | 9.4 |
| MgCl$_2$ | 75.3 | | | | | | | 56.3 | 74.5 | | | | |
| Chlorinated calcine | 716.7 | 32.1 | 4.4 | 76 | 10.6 | 183.5 | 24.8 | 0.4 | 0.05 | 3.4 | 4.7 | 0.5 | 0.7 |
| Chloride dust | 96.2 | 0.4 | 0.4 | | | | | 45.0 | 47.1 | 31.6 | 328 | 6.5 | 67.6 |

TABLE 2

Distribution of elements

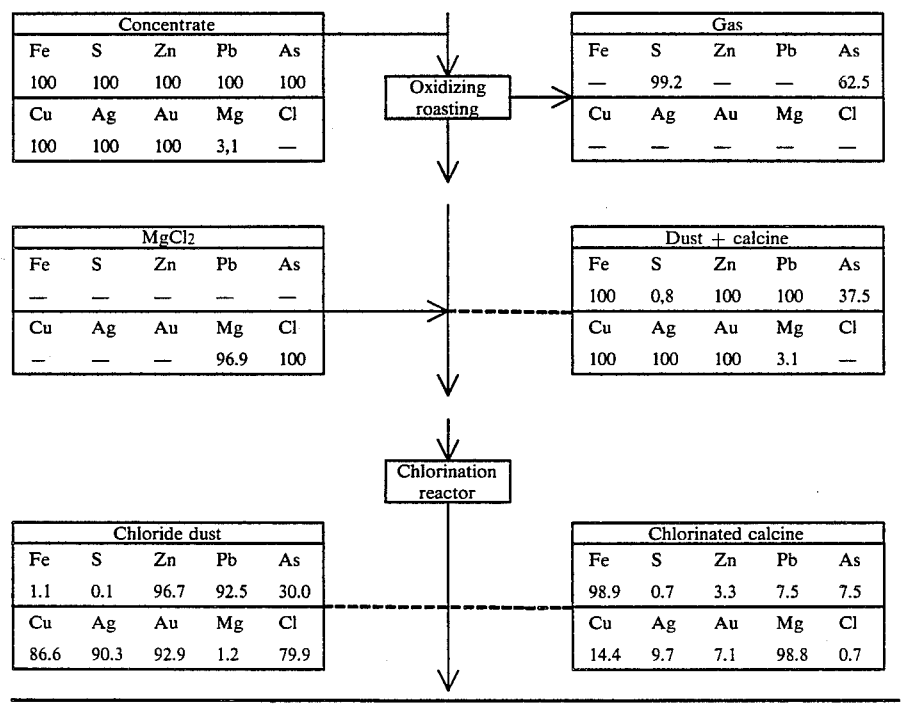

TABLE 3

|  | Amount | Fe | | Ni | | Cu | | Co | | MgO | | CaO | |
|---|---|---|---|---|---|---|---|---|---|---|---|---|---|
|  | kg | kg | % | kg | % | kg | % | kg | % | kg | % | kg | % |
| Laterite | 1000.0 | 206 | 20.6 | 17 | 1.7 | 0.1 | 0.01 | 1 | 0.1 | 177 | 17.7 | 7 | 0.7 |
| Product of reduction | 790.7 | 206 | 26.1 | 17 | 2.2 | 0.1 | 0.01 | 1 | 0.13 | 177 | 22.4 | 7 | 0.88 |
| MgCl$_2$ | 37.1 | | | | | | | | | | | | |
| Product of chlorination | 786.5 | 203.9 | 26.0 | 1.5 | 0.19 | 0.03 | 0.004 | 0.19 | 0.002 | 191.3 | 24.5 | 7 | 0.89 |
| Chloride dust | 43.4 | 2.1 | 4.9 | 15.5 | 35.7 | 0.07 | 0.17 | 0.81 | 1.9 | 1.2 | 2.8 | | |

|  | Amount | Al$_2$O$_3$ | | SiO$_2$ | | O | | hydroxide | | Cl | |
|---|---|---|---|---|---|---|---|---|---|---|---|
|  | kg | kg | % | kg | % | kg | % | kg | % | kg | % |
| Laterite | 1000.0 | 64 | 6.4 | 289 | 28.9 | 89 | 8.9 | 150 | 15.0 | | |
| Product of reduction | 970.7 | 64 | 8.1 | 289 | 36.5 | 29.6 | 3.7 | | | | |
| MgCl$_2$ | 37.1 | | | | | | | | | 27.8 | 74.8 |
| Product of chlorination | 786.5 | 64 | 8.1 | 289 | 36.8 | 28.9 | 3.7 | | | 0.2 | 0.03 |
| Chloride dust | 43.4 | | | | | | | | | 23.1 | 53.1 |

TABLE 4
Distribution of elements

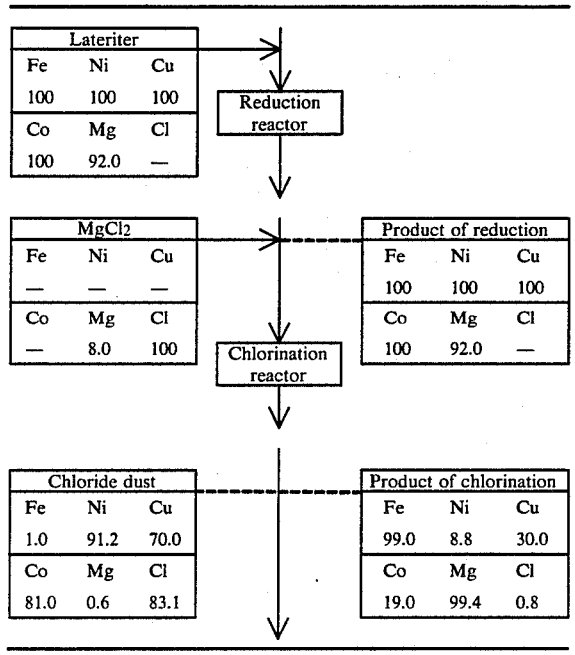

What is claimed is:

1. A process for the chlorinating volatilization in a fluidized bed reactor of impurity metals detrimental to the production of iron from a raw material which contains the oxides of the impurity metals and iron or which forms them in an oxidizing atmosphere, comprising feeding preheated raw material at a high temperature of at least 900° C. and anhydrous magnesium chloride into an upper section of the fluidized bed reactor to chlorinate the impurity metals and maintaining the temperature above 900° C. throughout the following steps: feeding hot air into the fluidized bed through an inclined grate which is in a lower section of the fluidized bed reactor in order to volatilize the chlorides of the impurity metals, and discharging purified raw material from the lower section of the fluidized bed into a separate chamber, and rinsing the raw material in said separate chamber with an air flow the rate of which is substantially higher than that of the air flow fed into the fluidized bed.

2. A process according to claim 1, in which air is fed into the fluidized bed at a flow rate of 1–30 cm/s, and the purified raw material fed into a separate chamber is rinsed with air the flow rate of which is 0.5–15 m/s.

3. A process according to claim 1, in which the raw material is brought to a temperature of at maximum about 1250° C. by feeding fuel into the fluidized bed or by reducing part of the raw material before it is fed into the fluidized bed.

4. A process according to claim 1, in which the magnesium chloride is regenerated from the gases removed from the fluidized bed and rinsing air, and is mixed with the raw material either as a solid or as a melt spray.

* * * * *